United States Patent
Jones

(10) Patent No.: US 7,758,255 B2
(45) Date of Patent: Jul. 20, 2010

(54) SYSTEM AND APPARATUS FOR FIBER OPTIC CONNECTOR

(75) Inventor: Richard C. Jones, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/747,376

(22) Filed: May 11, 2007

(65) Prior Publication Data
US 2008/0279503 A1 Nov. 13, 2008

(51) Int. Cl.
G02B 6/38 (2006.01)
G02B 6/36 (2006.01)
G02B 6/40 (2006.01)

(52) U.S. Cl. ............... 385/73; 385/74; 385/60; 385/53; 385/54; 385/55; 385/56

(58) Field of Classification Search ......... 385/53–56, 385/60, 70–74
See application file for complete search history.

(56) References Cited

U.S. PATENT DOCUMENTS

| | | | | |
|---|---|---|---|---|
| 3,936,145 | A * | 2/1976 | McCartney | 385/58 |
| 4,111,522 | A * | 9/1978 | Auracher et al. | 385/65 |
| 4,140,367 | A | 2/1979 | Makuch et al. | |
| 4,699,458 | A * | 10/1987 | Ohtsuki et al. | 385/59 |
| 4,733,936 | A | 3/1988 | Mikolaicyk et al. | |
| 4,798,428 | A * | 1/1989 | Karim et al. | 385/74 |
| 4,834,494 | A * | 5/1989 | DeMeritt et al. | 385/61 |
| 5,210,815 | A * | 5/1993 | Alexander et al. | 385/138 |
| 5,701,375 | A * | 12/1997 | Duck et al. | 385/74 |
| 6,302,593 | B1 * | 10/2001 | Haake | 385/74 |
| 2002/0146211 | A1 | 10/2002 | Stevens et al. | |
| 2004/0061954 | A1 * | 4/2004 | Ludington et al. | 359/793 |
| 2005/0220423 | A1 | 10/2005 | Asano | |
| 2007/0196053 | A1 * | 8/2007 | Kewitsch | 385/74 |

FOREIGN PATENT DOCUMENTS

DE 202004009423 U1 6/2004

OTHER PUBLICATIONS

"Avionics fiber-optic and photonics network preliminary technology readiness assessment," by Beranek et al, Digital Avionics Systems Conference, Oct. 24-28, 2004, vol. 2, pp. 9.B.3.1-9.B.3-8.*

(Continued)

Primary Examiner—Charlie Peng
Assistant Examiner—Robert Tavlykaev
(74) Attorney, Agent, or Firm—Bracewell & Giuliani LLP

(57) ABSTRACT

A fiber optic connector uses an expanded light beam design in a universal receptacle that couples to a single style of plug on the ends of all harnesses. A single, mirror image socket design is used on bulkhead receptacles or box connections, with which two harness plugs mate. The receptacle uses optical lenses for expanding, collimating, and focusing the beam from the plug terminii. The optical lens may comprise rod lenses, ball lenses, or any other optical component that accomplishes the desired beam manipulation with the required diameters and lengths. The optical components are captured in a sleeve that holds the components, establishes the distance between the plug terminii and the lenses, and provides the alignment needed between the plug ferrules and the optical components.

11 Claims, 3 Drawing Sheets

OTHER PUBLICATIONS

"MIL-T-29504/5 qualified size 16 fiber optic socket terminus for use with MIL-DTL-38999 type connectors," product part # 181-001, Glenair Inc., available online as of Oct. 22, 2005.*

"Expanded beam fiber optic connection system", by Glenair Inc, available online as of Mar. 14, 2006.*

"MIL-DTL-38999 type fiber optic connectors, insert arrangements, panel cut-out," by Gelair Inc, available online as of Feb. 28, 2005.* timbercon.com, "Hermaphroditic Connectors", Apr. 16, 2007, Internet, http://timbercon.com/Hermaphroditic-Connectors/index.html timbercon.com, "MIL Specialty", Apr. 16, 2007, Internet, http://timbercon.com/MIL-Specialty/index.html.

timbercon.com, "MIL Termini", Apr. 16, 2007, Internet, http://timbercon.com/MIL-Termini/index.html/index.html.

timbercon.com, "D38999", Apr. 16, 2007, Internet, http://timbercon.com/D38999/index.html.

Timbercon, Inc., Drawing, "Fo Cable Assy MM LC to MIL-T-29504/5, 50/125 Micron", Product No. 425-1104-052, Size A, Aug. 8, 2005.

Timbercon, Inc., Drawing, "3CH Loopback D38999 Plug C", Product No. X-425-1130-0000, Size A, Aug. 8, 2005.

* cited by examiner

SYSTEM AND APPARATUS FOR FIBER OPTIC CONNECTOR

BACKGROUND OF THE INVENTION

1. Technical Field

The present invention relates in general to fiber optics and, in particular, to an improved system and apparatus for a fiber optic connector.

2. Description of the Related Art

Currently, all military fighter aircraft that use fiber optics use physical contact butt connection type connectors (i.e., D38999 with Mil-T-29504 terminii). These connectors are the same style used for electrical connectors, only with much tighter tolerances, and comprise various plug and receptacle connections. For fiber optic applications, the socket terminii are typically spring-loaded and recessed in an alignment sleeve to mate with respective pins on a receptacle. The sockets are usually placed in a plug on a flexible harness to make their difficult-to-clean recessed end faces easier to access during cleaning operations. The fixed, bulkhead-mounted receptacles usually contain the easier-to-clean termination pins because they are typically more difficult to access during cleaning operations.

One type of design incorporates an "expanded beam" connector that requires the plug and receptacle style. A significant benefit of expanded beam connectors is that with a larger beam size, dirt particles block a smaller percentage of the light and therefore have lesser impact on system performance. However, all current expanded beam connectors use ball lenses in front of the fibers. The fiber must be placed at a very precise distance from the ball lens to allow the light to expand to a fixed diameter before the ball lens collimates the beam. The receiving fiber also requires a ball lens to receive the collimated light and re-focus it back into the receiving fiber. One problem with this design is that the fibers must be exactly the same distances from the ball lenses, and this requirement must be precisely maintained regardless of the environmental conditions in which operation is required. Unfortunately, the distances comprise air gaps that can become contaminated with pollutants, and the distances expand and contract with temperature. Consequently, the production of these connections is very difficult and requires very specialized equipment.

In addition, the use of multiple plug and receptacle connections creates numerous mating-related problems, and these connections must be carefully cleaned for optimum performance. Cleaning procedures are tedious and lengthy processes that sometimes get ignored, which causes issues at inspection. In addition, the end faces are occasionally damaged, which requires the cables to be removed and replaced. Expanded beam connectors also have trouble being qualified due to problems holding the alignment of the fiber to the ball lenses, and they are larger and heavier than conventional assemblies. Thus, an improved solution that addresses and overcomes these problems would be desirable.

SUMMARY OF THE INVENTION

A system and apparatus for an expanded light beam connector comprises a universal receptacle. The receptacle incorporates ball lenses, rod lenses (also known as a GRIN (Graded Index) lens or SELFOC (self-focusing) lens), or any other optical component that accomplishes the desired beam manipulation with the required diameters and lengths. A rod lens essentially comprises a very large fiber that has a graded index profile that forms the light into a sine wave. The length of the rod lens determines where the sine wave is trimmed to selectively expand, collimate and focus the light.

The simplified design allows for the use of a single style of plug on the ends of all harnesses and incorporates spring-loaded sockets in the plugs to ensure proper positioning of the optical fibers with respect to the receptacle. Thus, only one type of plug is required for the ends of all harnesses, and only one type of receptacle is required to mate with the plugs, which greatly reduces the risk of attaching the wrong parts during assembly. The receptacle incorporates a mirror image pin design and may be used on bulkhead receptacles or connections to boxes, with which two of the plugs mate (i.e., one on each end of the receptacle). The pin in the receptacle has a ferrule that protrudes from the end faces of the receptacle in the same manner as pin terminii, which greatly simplifies the cleaning of these parts. This receptacle uses a pair of optical lenses on each socket for expanding, collimating, and focusing the beam from the plug terminii.

The optical components are captured in a ferrule that holds the components, contains a ring, disk, or ledge that sets the distance between the plug terminii and the lenses, and provides the alignment needed between the plug ferrules and the optical components. The optical components are recessed in the pin ferrule, but the optical beam is expanded making cleaning less critical since particles have less impact on the power throughput. In addition, both sides of the receptacle can be unthreaded and a quick release attachment for the receptacle allows the receptacle to be readily accessed for cleaning purposes.

This design also overcomes a significant issue faced by connectors that require physical contact. Damaged end faces or test probes with damaged end faces cannot transfer their damage to the end faces they are mated with since, in this design, no end faces physically touch each other. In addition, it is easier to replace a damaged fiber when the receptacle does not have to be removed, but rather just a plug unthreaded. This invention not only makes all cleaning procedures easier and less critical, but it also reduces the requirement for the tight tolerances between the end faces. Moreover, the invention does add volume, and only a minor amount of weight. Furthermore, this design improves the reliability of the fiber optic connections, reduces the impact of end face degradation, reduces the reliance on ever more increasing requirements for tighter tolerances on all parts, and reduces costs for the parts.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Embodiments of a system and apparatus for a fiber optic connector that employs an expanded beam receptacle are disclosed. In one embodiment, a rod lens is used to expand light out of a fiber on one side of the receptacle, and then re-focus the light back into a receiving fiber on the other side of the receptacle. The receptacle forms a mirror-image connector design that eliminates a pin and socket connection.

In one embodiment, the invention incorporates the external thread specifications from Military D38999-style connectors on both ends of the receptacle instead of just one end. The reliability of this design has been proven over many years and recently was improved to work for fiber optics by restricting all mating tolerances to minimize light loss in the mating process. The receptacle mates with two conventional D38999 plugs, each of which contains one or more socket terminii (e.g., Mil-T-29504) for mating with features in the receptacle. The parameters for both types of specifications (i.e., D38999 and Mil-T-29504) are incorporated herein by reference.

Thus, the receptacle is greatly simplified to couple with harnesses having only plugs with socket contacts. The receptacles are ideally suited for use on bullheads and on "boxes" (e.g., stand alone components). The one or more pins that extend through the receptacle have unique terminii that may incorporate one or more 1.8 mm ceramic ferrules, but contain a pair of expanded beam connectors (e.g., rod lenses having a 1.0 mm diameter and half-inch axial length) that set an exact position and proper distance required between the optical fibers in the plugs and the front sides of the lens elements. The lenses expand and collimate the light that enters the receptacle from the optical fiber in one of the plugs, and then transmits the collimated light and re-focuses it back into the receiving optical fiber in the opposite plug.

Figure 1:
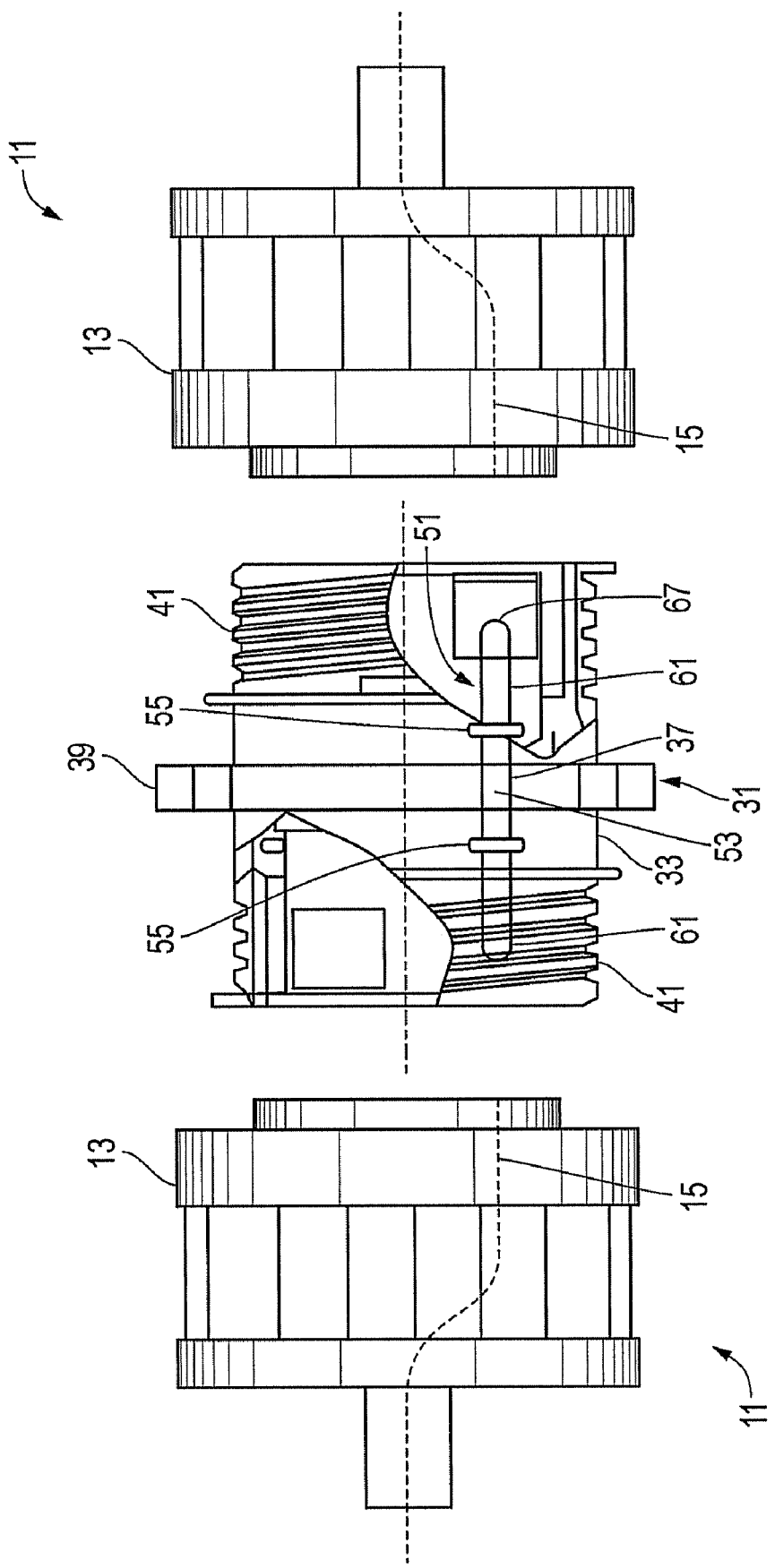
FIG. 1 is an exploded, partially sectioned side view of one embodiment of an optical fiber connector system constructed in accordance with the invention.
Figure 2:
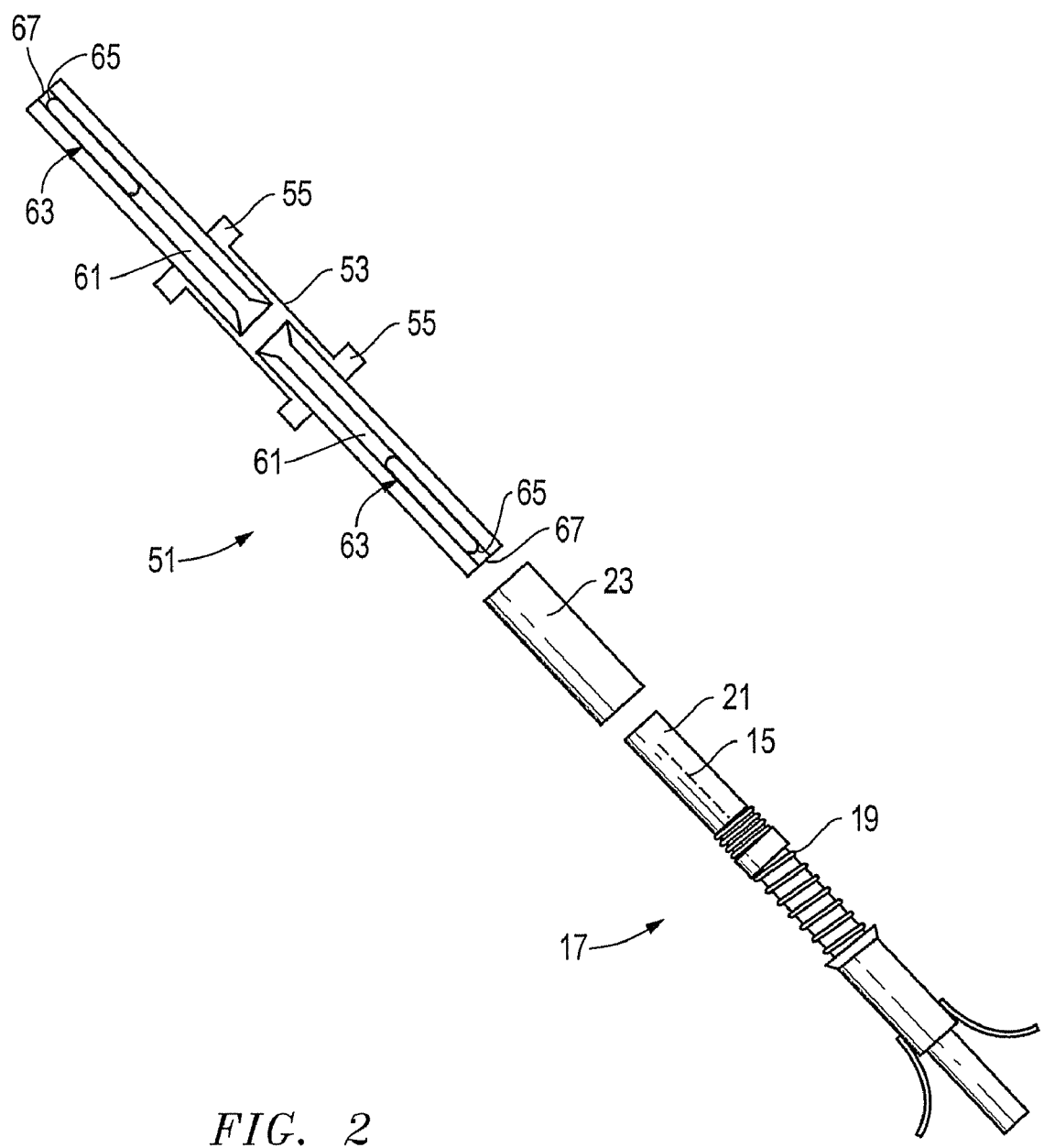
FIG. 2 is an enlarged, exploded, partially sectioned side view of one embodiment of terminii used by the optical fiber connector system of FIG. 1 and is constructed in accordance with the invention.
Figure 5:
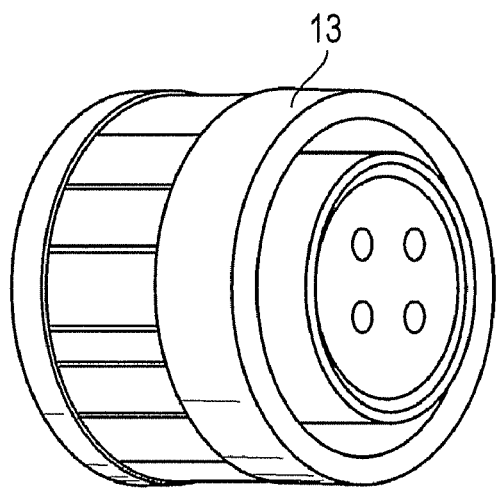
FIG. 5 is an isometric view of a conventional plug that may be used in conjunction with the invention.

Referring now to the drawings, one embodiment of a system for transmitting fiber optic light comprises a pair of harnesses 11 (FIG. 1) having identical plugs 13 (FIGS. 1 and 5). An optical fiber 15 (shown in dashed line and greatly exaggerated in size) extends through respective ones of the plugs 13. Each of the optical fibers 15 is mounted in a socket termini 17 (FIG. 2) that is spring-loaded 19 and recessed in an alignment sleeve 21, and shrouded in a protective collar 23. In one embodiment, the socket terminii 17 comprise Mil-T-29504 terminii.

Figure 3:
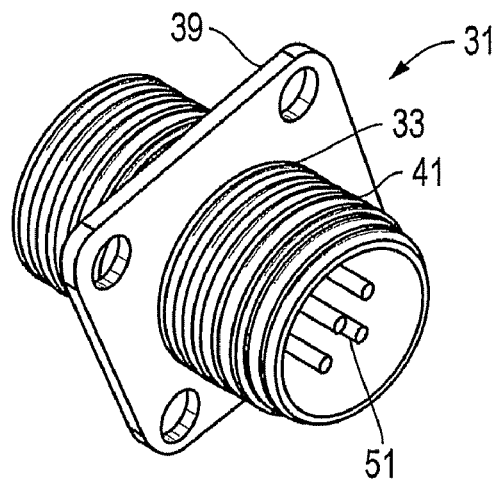
FIG. 3 is an isometric view of a receptacle for the optical fiber connector system of FIG. 1 and is constructed in accordance with the invention.

Referring to FIGS. 1 and 3, a receptacle 31 is used to transmit light from one of the optical fibers 15 to the other of the optical fibers 15. The receptacle 31 has a tubular body 33 with an axis 35. One or more parallel apertures 37 extend through the tubular body 33 in an axial direction. A mounting structure, such as a flange 39, extends from the tubular body 33 for mounting the receptacle 31 to an object, such as a bulkhead or box. The flange 39 may bisect the receptacle 31 and be oriented in a plane that is perpendicular to the axis 35.

In one embodiment, a pair of fastening elements 41 (which may be identical and mirror images of each other) are located on opposite axial sides of the mounting structure 39. The identical fastening elements 41 are secured to respective ones of the plugs 13 to form an assembly, and may comprise D38999 external threads as shown.

Figure 4:
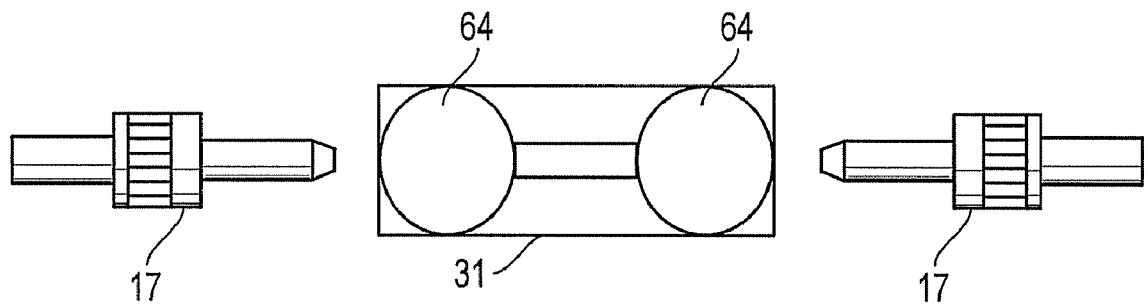
FIG. 4 is a schematic side view of another embodiment of a termini for the receptacle of FIG. 3 and is constructed in accordance with the invention.

One or more pins 51 (FIGS. 1-3) are mounted in the receptacle 31. Each pin 51 extends through one of the apertures 37, however not all apertures 37 need be populated with pins 51, depending on the application. When receptacle 31 is assembled to plugs 13, the pins 51 mate with the socket terminii 17. Each pin 51 has a termini body 53 with one or more retention shoulders 55 for aligning the pin 51 within a respective aperture 37. In one embodiment, a pair of ferrules 61 (FIG. 3) are coaxially mounted in the termini body 53. An expanded beam optical component 63 (e.g., a rod lens (FIG. 2), ball lens 64 (FIG. 4), etc.) is mounted in each ferrule 61. Each expanded beam lens 63 has an axial end 65 (FIG. 2) that is located adjacent to an axial end 67 of a respective one of the ferrules 61. The expanded beam lenses 63 expand and collimate light from one of the optical fibers 15 and focus the light to the other of the optical fibers 15.

In one embodiment (FIG. 2), the expanded beam lenses 63 are axially spaced apart from each other as shown, and the axial ends 65 of the expanded beam lenses 63 are axially recessed from the axial ends 67 of respective ones of the ferrules 61. In addition, the ferrules 61 may be coaxially mounted within the termini body 53 and axially spaced apart from each other as shown. In one embodiment, the termini body 53 is formed from stainless steel and the ferrules 61 are formed from ceramic material. The retention shoulders 55 may be located on axially opposite ends of the termini body 53, and the termini body 53 may be provided with an axial length that is less than an axial length of one or both of the ferrules 61.

While the invention has been shown or described in only some of its forms, it should be apparent to those skilled in the art that it is not so limited, but is susceptible to various changes without departing from the scope of the invention.

What is claimed is:

1. A fiber optic connector assembly, comprising:

a receptacle having an axis, an aperture extending through the receptacle in an axial direction, a mounting structure adapted to mount the receptacle to an object, and a pair of fastening elements located on opposite sides of the mounting structure;

a pair of optical fibers coupled to opposite ends of the receptacle, each optical fiber having a socket termini with an alignment sleeve;

at least one pin mounted in the receptacle and extending through the axial aperture, the at least one pin having a termini body with at least one external retention shoulder, at least one ferrule extending through and protruding from opposite ends of the termini body, and an expanded beam optical component mounted in an axial passage inside the at least one ferrule, the expanded beam optical component having axial ends located adjacent to axially opposite ends of the at least one ferrule, the expanded beam optical component being adapted to expand and collimate light from one of the optical fibers coupled to one of the ends of the receptacle, and focus the light to the other optical fiber coupled to the opposite end of the receptacle; wherein the at least one ferrule has at least one axial end with a diameter such that the at least one axial end interfaces, in an abutting manner, an axial end of the alignment sleeve of a respective one of the pair of optical fibers when the optical fibers are coupled to opposite ends of the receptacle;

the receptacle has a plurality of parallel apertures extending therethrough in the axial direction, and the at least one pin comprises a plurality of pins that are mounted in at least some of the parallel apertures; and wherein the expanded beam optical component comprises a pair of lenses that are axially spaced apart from each other, and the axial ends of the pair of lenses are axially recessed from the axially opposite ends of the at least one ferrule.

2. A fiber optic connector assembly according to claim 1, wherein the pair of fastening elements comprises external threads, and the optical fibers are mounted in harness plugs.

3. A fiber optic connector assembly according to claim 1, wherein the at least one ferrule comprises a pair of ferrules coaxially mounted within the termini body and axially spaced apart from each other, and one of the pair of lenses is mounted in each of the ferrules.

4. A fiber optic connector assembly according to claim 1, wherein the mounting structure bisects the receptacle and is oriented in a plane that is perpendicular to the axis, and the pair of fastening elements are identical mirror images of each other on opposite sides of the mounting structure.

5. A fiber optic connector assembly according to claim 1, wherein each of the lenses comprises a rod lens.

6. A fiber optic connector assembly according to claim 1, wherein the at least one retention shoulder on the termini body of the pin comprises a pair of the retention shoulders that are located on axially opposite ends of the termini body, and wherein the at least one ferrule comprises a pair of the ferrules, and the termini body has an axial length that is less than an axial length of one of the ferrules.

7. A fiber optic connector assembly, comprising:
a receptacle having a tubular body with an axis, a plurality of parallel apertures extending through the tubular body in an axial direction, a mounting structure extending from the tubular body and adapted to mount the receptacle to an object, and sets of threads located on opposite sides of the mounting structure;
a pair of plugs, each coupled to one of the sets of threads of the receptacle;
an optical fiber mounted in each plug, each optical fiber having a socket termini wherein an end of the fiber is mounted in an alignment sleeve;
a pin mounted in the receptacle and extending through one of the apertures, the pin having a termini body with an axial passage and at least one retention shoulder for aligning the pin within said one of the apertures, the termini body having a pair of ferrules coaxially mounted in the axial passage of the termini body and axially spaced apart from each other, each of the ferrules having an axial end protruding from an opposite end of the termini body, and an expanded beam lens mounted within an axial passage in each ferrule, each expanded beam lens having an axial end located adjacent to the axial end of a respective one of the ferrules, the expanded beam lenses being adapted to expand and collimate light from one of the optical fibers of one of the plugs and focus the light to the other optical fiber; wherein the expanded beam lenses are axially spaced apart from each other, and the axial ends of the expanded beam lenses are axially recessed from the axial ends of said respective ones of the ferrules; and wherein
each of the ferrules has a diameter of the corresponding axial end such that the axial end of each ferrule interfaces, in an abutting manner, an axial end of the alignment sleeve of a respective optical fiber of the pair of optical fibers when the plugs are connected to the receptacle.

8. A fiber optic connector assembly according to claim 7, wherein the mounting structure bisects the receptacle and is oriented in a plane that is perpendicular to the axis, and the sets of threads are mirror images of each other on opposite sides of the mounting structure.

9. A fiber optic connector assembly according to claim 7, wherein each of the socket termini comprises a collar having one end into which one of the alignment sleeves inserts, the collar having an opposite end that slides over one of the ferrules when the plugs are connected to the receptacle.

10. A fiber optic connector assembly according to claim 7, wherein the at least one retention shoulder of the termini body comprises a pair of the retention shoulders that are located on axially opposite ends of the termini body, and the termini body has an axial length that is less than an axial length of one of the ferrules.

11. A fiber optic connector assembly, comprising:
a pair of plugs and an optical fiber extending from, each of the plugs, each of the optical fibers being mounted in a socket termini that is spring-loaded and recessed in an alignment sleeve;
a receptacle for transmitting light from one of the optical fibers to the other of the optical fibers, the receptacle having a tubular body with an axis, a plurality of parallel apertures extending through the tubular body in an axial direction, a mounting structure extending from the tubular body and adapted to mount the receptacle to an object, and a pair of fastening elements located on opposite sides of the mounting structure, the fastening elements being secured to respective ones of the plugs to form an assembly;
a pin mounted in the receptacle and extending through one of the apertures to mate the pin with the pair of socket termini, the pin having a termini body with at least one retention shoulder for aligning the pin within said one of the apertures, a pair of ferrules coaxially mounted in the termini body and axially spaced apart from each other, the ferrules protruding from opposite ends of the termini body, and an expanded beam lens mounted, within each ferrule, each expanded beam lens having an axial end located adjacent to an axial end of a respective one of the ferrules, such that the expanded beam lenses expand and collimate light from said one of the optical fibers and focus the light to said the other of the optical fibers; wherein
each of the ferrules has an axial end with a diameter such that each of the axial ends interfaces, in an abutting manner, an axial end of the alignment sleeve of a respective fiber of the pair of optical fibers, when the plugs are connected to the receptacle;
the expanded beam lenses comprise rod lenses that are axially spaced apart from each other, and the axial ends of the expanded beam lenses are axially recessed from the axial ends of said respective ones of the ferrules; and
the at least one retention shoulder of the termini body comprises a pair of retention shoulders that are located on axially opposite ends of the termini body, and the termini body has an axial length that is less than an axial length of one of the ferrules.

* * * * *